US010504043B2

(12) United States Patent
Fedak

(10) Patent No.: US 10,504,043 B2
(45) Date of Patent: Dec. 10, 2019

(54) SHIFT MANAGEMENT OVER SOCIAL NETWORKS

(71) Applicant: NCR Corporation, Duluth, GA (US)

(72) Inventor: Jan Fedak, Colleyville, TX (US)

(73) Assignee: NCR Corporation, Atlanta, GA (US)

( * ) Notice: Subject to any disclaimer, the term of this patent is extended or adjusted under 35 U.S.C. 154(b) by 432 days.

(21) Appl. No.: 15/282,015

(22) Filed: Sep. 30, 2016

(65) Prior Publication Data

US 2018/0096285 A1 Apr. 5, 2018

(51) Int. Cl.
*G06Q 10/06* (2012.01)
*G06Q 50/00* (2012.01)
*G06F 17/27* (2006.01)

(52) U.S. Cl.
CPC . *G06Q 10/063116* (2013.01); *G06F 17/2785* (2013.01); *G06Q 50/01* (2013.01)

(58) Field of Classification Search
CPC ............ G06Q 10/00–99/00; G06F 1/00–21/00
USPC ................................................ 705/7.11–7.42
See application file for complete search history.

(56) References Cited

U.S. PATENT DOCUMENTS

2008/0255919 A1* 10/2008 Gorder .................. G06Q 10/06 705/7.13
2013/0179440 A1* 7/2013 Gordon .................. G06Q 10/06 707/731
2015/0227579 A1* 8/2015 Cantarero ............ G06F 16/313 707/708

FOREIGN PATENT DOCUMENTS

CA 2744473 A1 * 12/2011 ............ G06Q 10/06

OTHER PUBLICATIONS

Computer Networks as Social Networks: Collaborative Work, Telework, and Virtual Community. Barry Wellman, Janet Salaff, Dimitrina Dimitrova, Laura Garton, Milena Gulia, Caroline Haythornthwaite Annual Review of Sociology 1996 22:1, 213-238. (Year: 1996).*

* cited by examiner

*Primary Examiner* — Alan S Miller
*Assistant Examiner* — Jay-Ming Wang
(74) *Attorney, Agent, or Firm* — Schwegman, Lundberg & Woessner

(57) ABSTRACT

Various embodiments herein each include at least one of systems, methods, and software for shift management over social networks. Some such embodiments include a bot that listens to one or more social network communication channels for textual postings that indicate an intent to request a shift trade or substitute and an intent to accept the trade or to be the substitute. Such intent may be identified in textual postings through natural language processing. A shift management system may be updated in some embodiments to keep data in the shift management system up to date. Such embodiments allow for modern communication between employees regarding shifts to be conducted via employee-preferred channels while also keeping shift management systems current.

8 Claims, 4 Drawing Sheets

SHIFT MANAGEMENT OVER SOCIAL NETWORKS

BACKGROUND INFORMATION

At many places of employment where employees work shifts, it is not uncommon for employees to trade shifts. However, managing shift trading, tracking changes, keeping everyone informed of who is to be working and when, and knowing who to call when no one shows up is, or at least can be, a challenge. To these ends, companies have implemented shift management software that management and employees use to assign and manage shifts. Some such solutions are available online. However, such solutions are not always updated when shifts are traded and are not included in modern communication channels. Rather, employees must go out and update the system either directly when a trade is made or ask someone else to make the update for them.

SUMMARY

Various embodiments herein each include at least one of systems, methods, and software shift management over social networks. Some such embodiments include a bot that listens to one or more social network communication channels for textual postings that indicate an intent to request a shift trade or substitute and an intent to accept the trade or to be the substitute. Some embodiments may also or alternatively utilized direct messaging available within certain social media platforms and even text messaging (e.g., SMS and similar messaging technologies). Such intent may be identified in textual postings through natural language processing. A shift management system may be updated in some embodiments to keep data in the shift management system up to date. Such embodiments allow for modern communication between employees regarding shifts to be conducted via employee-preferred channels while also keeping shift management systems current.

One embodiment, in the form of a method, includes identifying an intent to change an assignment within a textual posting and updating an assignment management system based on the identified assignment change intent.

Another method embodiment includes monitoring at least one social media platform for textual postings and identifying an intent of interest within one of the textual postings. This method may then apply a rule based on data included in or associated with the textual posting to identify and perform at least one action, the at least one action including updating a data stored by a computing system.

A further embodiment is in the form of a system. The system of such embodiments includes at least one network interface device, at least one processor and at least one memory. The at least one memory stores instructions executable by the at least one processor to perform data processing activities. The data processing activities include retrieving posting data via the at least one network interface from a social media platform and identifying an intent to change an assignment within the retrieved posting data. The data processing activities also include updating an assignment management system based on the identified assignment change intent.

DETAILED DESCRIPTION

Figure 1:
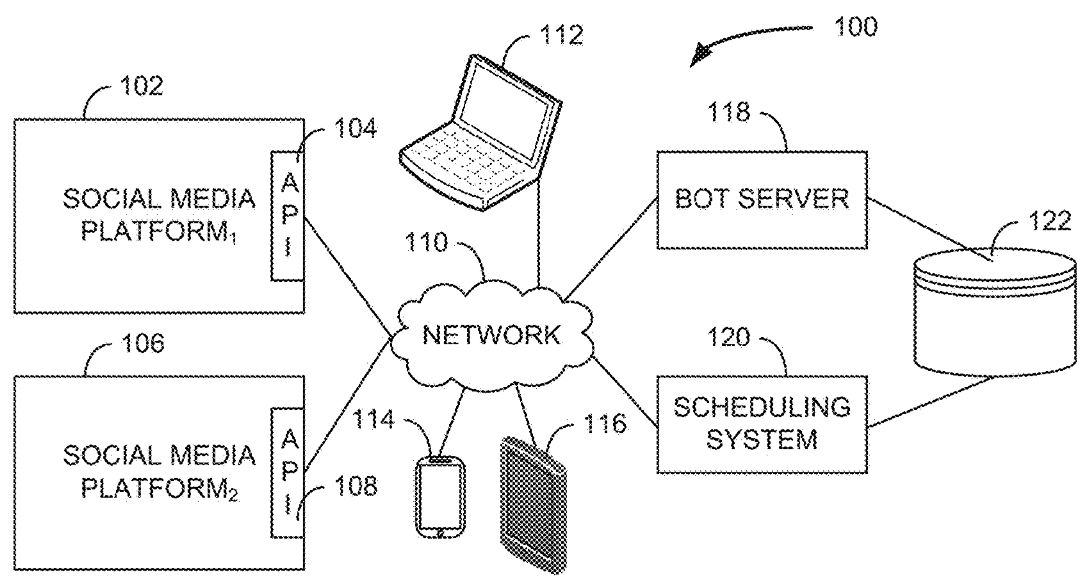
FIG. 1 is a logical architectural diagram of a system, according to an example embodiment.

Various embodiments herein each include at least one of systems, methods, and software shift management over social networks. Some such embodiments include a bot that listens to one or more social network communication channels for textual postings that indicate an intent to request a shift trade or substitute and an intent to accept the trade or to be the substitute. Such intent may be identified in textual postings by the bot through natural language processing of the textual postings. A shift management system may then be updated in some embodiments to keep data in the shift management system up to date when the bot identifies an intent to request a shift trade or substitution and when someone else accepts the trade or agrees to be the substitute. Such embodiments allow for modern communication between employees regarding shifts to be conducted via employee-preferred channels while also keeping shift management systems current.

As mentioned, some embodiments include a "bot" or other software element. The bot may connect to a forum over a computer network, such as a social media platform and particular channels, groups, and the like thereon, (e.g., Facebook group, Twitter List, Whatsapp group). Such channels are generally channels used or established by an employer, such as a restaurant, retail store, grocery store, to communicate with and enable communication between employees. The bots are deployed by the employer, either directly or indirectly through a cloud service provider, to listen in on the traffic on such channels. When the bot detects that someone is trying to trade a shift, the bot may connect to the appropriate labor management system and mark the shift as being offered for trade or substitution. The bot or the labor management system may also replicate the posting to other channels on the same and other social media platforms to help ensure the posting is widely distributed. Further, when the shift trade is accepted by another user in the forum, the bot reassigns the shift in the labor management system.

In various embodiments, the hot can be more or less verbose on the forum (e.g., confirm shift trades, ask clarifying questions, request confirmation, etc.) and may require more or less confirmation of the shift trade, such as by implying intent through natural language processing or explicitly by confirming intent by responding to an implied intent with questions to one or more employees.

Some embodiments may also include Additional functionality in the bot, or in other software elements, such as reminding employees in social media messages about upcoming shifts, identifying changes in employee information based on information available on the social media platform, although confirm is likely required in many such embodiments, and using the social network's graph for recruiting.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical architectural diagram of a system 100, according to an example embodiment. The system 100 includes at least one social media platform with an application programming interface (API) that enables other programs to communicate with the respective social media platforms to access data thereon and to communicate data thereto. For example, the system 100, as illustrated includes two social media platforms 102, 106, each with respective APIs 104, 108. Examples of the social media platforms 102, 106 may be FACEBOOK®, TWITTER®, and the like.

The social media platforms 102, 106 are connected to a network 110, such as the Internet. Also connected to the network 110 are client devices that interact with one or both of the social media platforms 102, 106 via web browser applications, apps, and the like. The client devices may be smartphones 114, tablets 116, personal computers 112, and other devices, such as smartwatches, smart-televisions and set top boxes, and the like, including smart exercise equipment.

A labor management system, such as a labor scheduling system 120 or one or more other systems, may also be connected to the network 110 along with a bot server 118. The scheduling system 120 is an example of a system on which an employer may manage work schedules for employees. Data maintained by the labor scheduling system 120 may be stored in a database 122. The bot server 118 is a server that provides an execution environment within which bots execute. Bots are programmed to monitor one or more communication channels of one or more social media platforms 102, 106 via their respective APIs 104, 108 to identify when an employee desires to trade a shift or otherwise find a shift substitute. The bot may be configured to associate employee records stored in the database 122 with social media platform identifiers such that when a posting is identified on a social media platform 102, 106, it can be quickly associated with a known employee and therefore their schedule within the scheduling system 120. In other embodiments, the bot may be configured to access employee records and scheduling data via an API of the scheduling system 120. Further, if an employee requests a shift substitute or trade, a bot may first confirm that requesting employee is actually scheduled at the noted time.

A bot may identify a posting to a social media platform 102, 106 based on an intent identified within a posting to a particular group, forum, or other social media platform 102, 106 channel. The intent may be identified through natural language processing that outputs one or more meanings from a posting which are then evaluated in view of one or more rules. The rules each include one or more intent meanings and one or more data processing activities that are to be performed when the intent meanings are matched with an intent identified in a posting by the natural language processing. The data processing activities may include verifying the requesting employee is actually scheduled for a shift when a substitute is requested and, when verified, replicating the substitute request to another social media platform. The data processing activities may further include recording the substitute request with the scheduling system 120. Subsequently, another posting to the channel on the social media platform 102, 106 may be made by another employee volunteering to fill the shift. The intent to fill the shift may be identified in the posting and a rule invoked. The data processing activities associated with that rule may first verify that the poster is in fact an employee and not otherwise scheduled for a shift at the same time based on data processing interactions with the scheduling system 120. In some embodiments, the hot or the scheduling system may perform further processing to ensure the employee is able to take the shift even if not otherwise scheduled due to working hour regulations, laws, company policies, employee status, and the like. The volunteering employee may be rejected if there are any violations or the employee's offer to fill the shift may be sent according to a defined workflow to a supervisor or manager for approval. Or, in some embodiments, the offer to fill the shift may be automatically approved and the rescheduling occurs. This rescheduling may include updating the scheduling system 120, updating one or more channels on one more of the social media platforms 102, 106, and sending other messages such as text messages, direct messages within one or more of the social media 102, 106 platforms, and the like.

Figure 2:
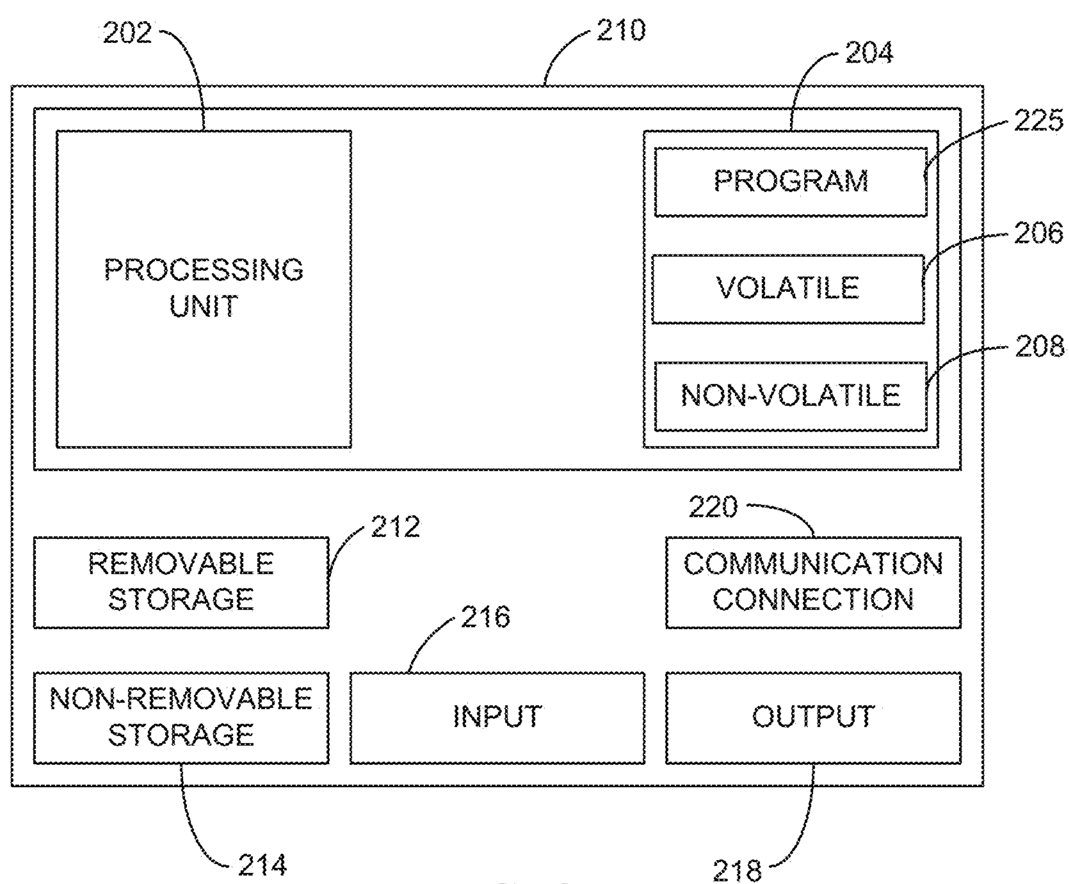
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction based environment. An object-oriented, service-oriented, message-oriented or other architecture may be used to implement such functions and communicate between the multiple systems and components. One example computing device in the form of a computer 210, may include a processing unit 202, memory 204, removable storage 212, and non-removable storage 214. Memory 204 may include volatile memory 206 and non-volatile memory 208. Computer 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 210 may include or have access to a computing environment that includes input 216, output 218, and a communication connection 220. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 202 of the computer 210. A hard drive, CD-ROM, and RAM are some examples of articles including a non-transitory computer-readable medium. For example, a computer program 225 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 210 to provide generic access controls in a COM based computer network system having multiple users and servers.

Figure 3:
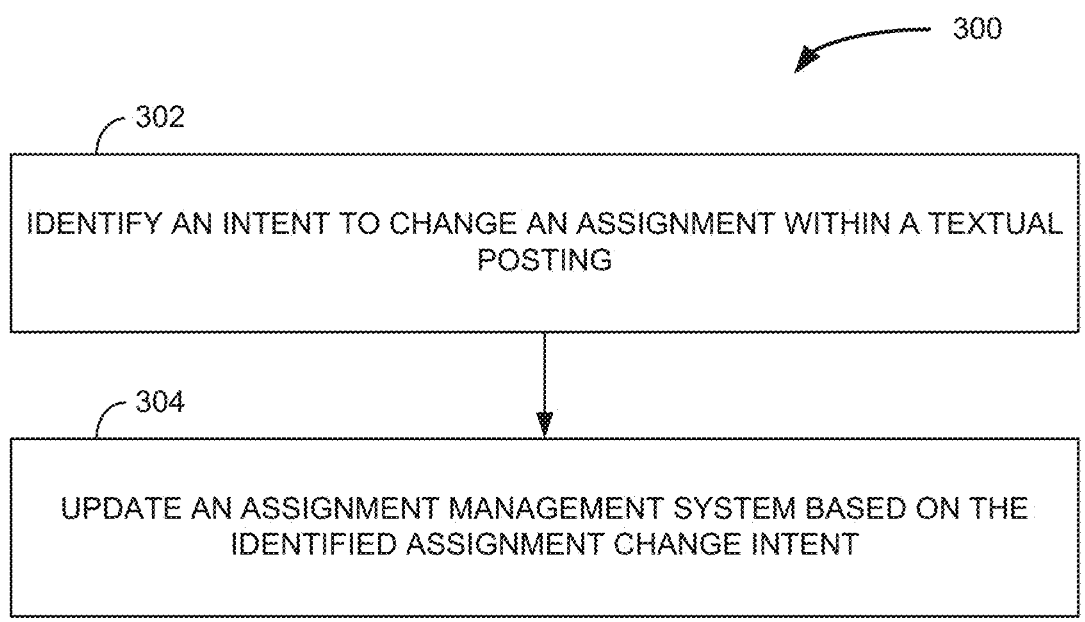
FIG. 3 is a block flow diagram of a method, according to an example embodiment.

FIG. 3 is a block flow diagram of a method 300, according to an example embodiment. The method 300 is an example of a method that may be performed by a bot that executes on the hot server 118 of FIG. 1. The method 300 includes identifying 302 an intent to change an assignment within a textual posting and updating 304 an assignment management system, such as the scheduling system 120 of FIG. 1, based on the identified assignment change intent.

In some embodiments, the intent is identified 302 through natural language processing of the textual posting in view of at least one assignment change rule. In a further embodiment, each of the at least one assignment change rules includes data indicating at least one intent type of interest and data associating the rule with an assignment management system that is accessed to confirm an identified intent.

In some of these embodiments, the assignment is a scheduled work shift, the intent of interest includes a request for an assignment substitute and an offer to be the assignment substitute, and the assignment management system is a computing system that manages work shift assignments. In some such embodiments, the data associating the rule to the assignment management system enables processing of the rule. The processing of the rule may be performed to confirm an identified intent requesting an assignment substitute for a work shift by confirming within data of the assignment management system that a first person that made the textual positing is assigned to the work shift. The processing of the rule may also or alternatively be performed to confirm an identified intent offering to be the assignment substitute for the work shift by confirming within data of the assignment management system that a second person that made the offer to be the assignment substitute is available to work in view of at least one other work shift assignment.

In some of these embodiments of the method 300, the textual posting is posting on a social media platform. In one such embodiment, when the identified intent to change the assignment is an intent offering to be the assignment substitute. In this embodiment, upon successfully updating the assignment management system for the second person to be the substitute, the method 300 includes adding a new textual posting to the social media platform indicating the request of the assignment substitute has been filled.

Figure 4:
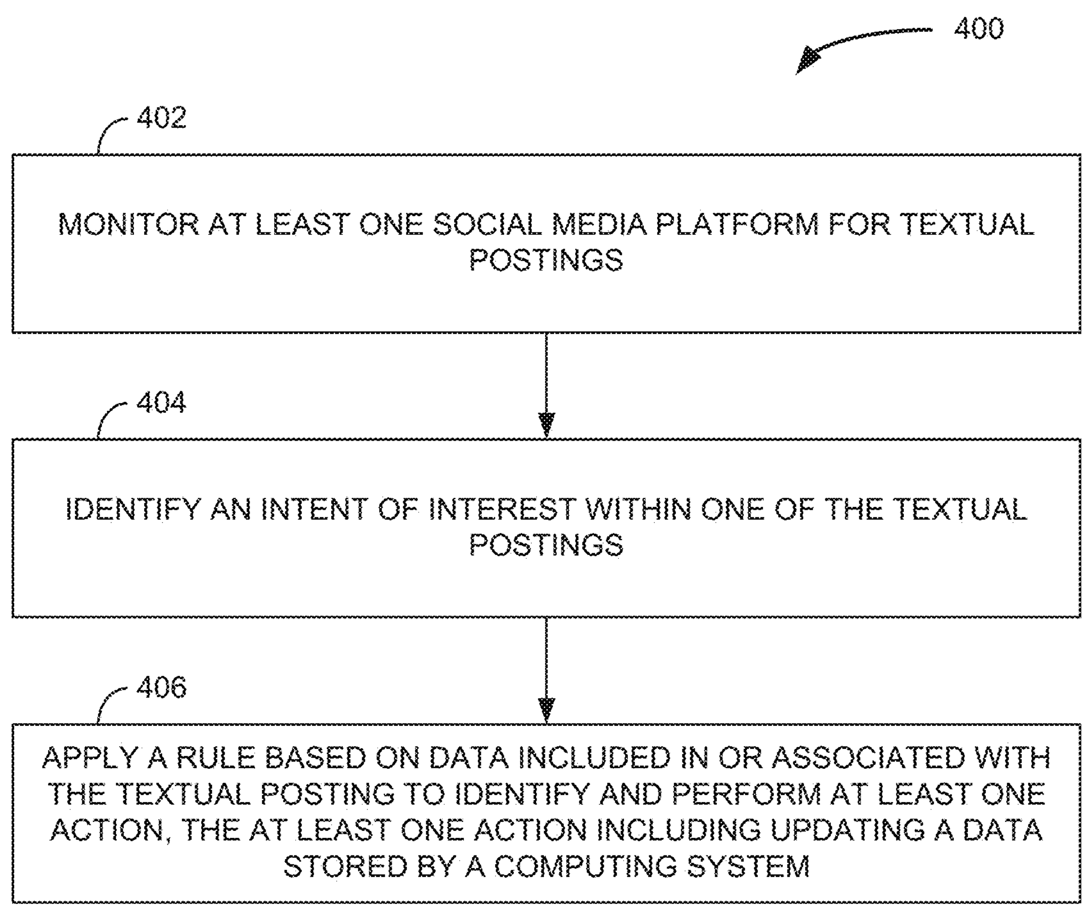
FIG. 4 is a block flow diagram of a method, according to an example embodiment.

FIG. 4 is a block flow diagram of a method 400, according to an example embodiment. The method 400 is another example of a method that may be performed by a bot that executes on the bot server 118 of FIG. 1. The method 400 includes monitoring 402 at least one social media platform for textual postings and identifying 404 an intent of interest within one of the textual postings. The method 400 further includes applying 406 a rule based on data included in or associated with the textual posting to identify and perform at least one action, the at least one action including updating a data stored by a computing system.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:

identifying an intent to change a work shift assignment within a textual posting to a social media platform by processing of the text on a computer data processor to identify the intent through performance of natural language processing of the textual posting on the computer data processor in view of at least one assignment change rule, each of the at least one assignment change rules includes:

data identifying at least one intent type of interest, the at least one intent type of interest including a request for an assignment substitute and an offer to be the assignment substitute; and data associating the rule with an assignment management system that is accessed to confirm an identified intent;

updating data stored by an assignment management computing system that manages work shift assignments based on the identified assignment change intent; and wherein the data associating the rule to the assignment management system enables processing of the rule to confirm:

an identified intent requesting an assignment substitute for a work shift by confirming within data of the assignment management system that a first person that made the textual positing is assigned to the work shift; and an identified intent offering to be the assignment substitute for the work shift by confirming within data of the assignment management system that a second person that made the offer to be the assignment substitute is available to work in view of at least one other work shift assignment.

2. The method of claim 1, further comprising:

when the identified intern to change tire assignment is an intent offering to be the assignment substitute and upon successfully updating the assignment management system for the second person to be the substitute, adding a new textual posting to the social media platform indicating the request of the assignment substitute has been tilled.

3. The method of claim 2, wherein when a textual posting with intent of interest is identified and when a new textual posting is made to the social media platform, the method includes:

replicating the posting to at least one other social media platform.

4. The method of claim 1, wherein an Intent of interest of an assignment change rule Includes an intent requesting an assignment substitute for a work shift and data defining or associating the rule to a workflow process, the work flow process routing the request to an account of an individual having responsibility for approving and denying assignment change requests.

5. A system comprising:

at least one network interface device;

at least one processor;

at least one memory storing instructions executable by the at least one processor to perform data processing activities, the data processing activities comprising:

retrieving posting data via the at least one network interface from a social media platform;

identifying an intent to change a work shift assignment within the retrieved posting data through performance of natural language processing of textual data of the retrieved posting data on the at least one processor in view of at least one assignment change rule, each assignment change rules including:

data identifying at least one intent type of interest, the at least one intent type of interest including a request for an assignment substitute and an offer to be the assignment substitute; and data associating the rule with an assignment management system that is accessed to confirm an identified intent;

updating data stored by an assignment management system based on the identified assignment change intent; and wherein:

the assignment management system is a computing system that manages work shift assignments; and, the data associating the rule to the assignment management system enables processing of the rule to confirm:

an identified intent requesting an assignment substitute for a work shift by confirming within data of the assignment management system that a first person that made the textual positing is assigned to the work shift; and an identified intent offering to be the assignment substitute for the work shift by confirming within data of the assignment management system that a second person that made the offer to be the assignment substitute is available to work in view of at least one other work shift assignment.

6. The system of claim 5, wherein each of the at least one assignment change rules includes data indicating at least one intent type of interest and data associating the rule with an assignment management system that is accessed to confirm an identified intent.

7. The system of claim 5, wherein the textual posting is posting on a social media platform.

8. The system of claim 7, further comprising:

when the identified intent to change the assignment is an intent offering to be the assignment substitute and upon successfully updating the assignment management system for the second person to be the substitute, adding a new textual posting to the social media platform indicating the request of the assignment substitute has been filled.

* * * * *